United States Patent [19]

Fischer

[11] 4,426,847
[45] Jan. 24, 1984

[54] RECIPROCATING HEAT ENGINE

[75] Inventor: Victor H. Fischer, Artarmon, Australia

[73] Assignee: Thermal Systems Limited, Cayman Islands

[21] Appl. No.: 215,825

[22] Filed: Dec. 12, 1980

[30] Foreign Application Priority Data

Aug. 18, 1980 [AU] Australia .................. PE5094

[51] Int. Cl.³ ............................................... F01K 7/36
[52] U.S. Cl. ............................. 60/514; 60/670; 60/689
[58] Field of Search ........... 60/508, 511, 514, 516, 60/643, 645, 651, 670, 671, 689; 122/249

[56] References Cited

U.S. PATENT DOCUMENTS

| | | | |
|---|---|---|---|
| 1,746,158 | 2/1930 | Loffler | 122/249 |
| 1,778,817 | 10/1930 | Spiro . | |
| 2,094,621 | 10/1937 | Savage | 60/27 |
| 2,429,035 | 10/1947 | Steving, Jr. | 60/645 |
| 2,830,435 | 4/1958 | Mallory | 60/27 |
| 2,839,888 | 6/1958 | Mallory | 60/1 |
| 2,867,975 | 1/1959 | Mallory | 60/27 |
| 2,984,067 | 5/1961 | Morris | 60/27 |
| 3,192,705 | 7/1965 | Miller | 60/509 X |
| 3,251,183 | 5/1966 | Whitlow | 60/514 |
| 3,599,425 | 8/1971 | Lewis . | |
| 3,609,965 | 10/1971 | Hercher | 60/27 |
| 3,956,894 | 5/1976 | Tibbs | 60/508 |
| 3,972,194 | 8/1976 | Eskeli | 60/682 X |
| 4,004,421 | 1/1977 | Cowans | 60/516 |
| 4,055,951 | 11/1977 | Davoud et al. | 60/514 |
| 4,077,214 | 3/1978 | Burke | 60/512 |
| 4,109,468 | 8/1978 | Heath | 60/671 X |
| 4,195,481 | 4/1980 | Gregory | 60/516 |
| 4,220,005 | 9/1980 | Cutts | 60/514 |

FOREIGN PATENT DOCUMENTS

| | | |
|---|---|---|
| 617649 | 8/1935 | Fed. Rep. of Germany . |
| 689961 | 4/1940 | Fed. Rep. of Germany . |
| 1953874 | 5/1971 | Fed. Rep. of Germany . |
| 2405380 | 2/1974 | Fed. Rep. of Germany . |
| 2325279 | 1/1975 | Fed. Rep. of Germany . |
| 2329020 | 1/1975 | Fed. Rep. of Germany . |
| 2416964 | 10/1975 | Fed. Rep. of Germany . |
| 1352510 | 5/1974 | United Kingdom . |
| 1524268 | 9/1978 | United Kingdom . |

Primary Examiner—Allen M. Ostrager
Assistant Examiner—Stephen F. Husar
Attorney, Agent, or Firm—Bernard, Rothwell & Brown

[57] ABSTRACT

A reciprocating external combustion engine wherein energy is supplied to a working end space of the engine by direct injection into the cylinder of liquid water at a high temperature and pressure. The water acts as a heat-transfer medium. Some of the liquid water spontaneously vaporizes on injection, driving the piston. Liquid water is exhausted from the cylinder and recycled to an external heat exchanger for reheating prior to reinjection. The engine is capable of a thermal efficiency greater than that of the Rankine cycle.

25 Claims, 10 Drawing Figures

RECIPROCATING HEAT ENGINE

The present invention relates to a reciprocating external combustion engine, i.e., an engine of the type having a cylinder or cylinders whose reciprocating motion provides a source of power and wherein the heat powering the engine is generated externally of the cylinder. In particular, the invention provides a novel operating cycle.

Many attempts have been made to produce an engine which combines high thermal efficiency in terms of converting applied heat energy into useful work, with acceptable power to weight and power to volume ratios for the engine. The internal combustion engine has a good power to weight ratio but a relatively low thermal efficiency. The diesel engine has the best thermal efficiency (up to around 40 percent). Thermodynamically more efficient engines based on the Carnot, Stirling and Ericsson cycles have been built but these have not in general been commercial successes, largely on account of the problem of providing a small and efficient heat exchanger enabling the working gas to become quickly and efficiently heated by the external heat source.

The steam engine is a well known form of external combustion engine but its power to weight ratio is generally low, owing to its requiring a separate steam boiler and condenser. The steam engine generally uses dried steam or other dry vapor as the working fluid. Moreover, the efficiency of the steam engine is restricted by the limitations of the Rankine cycle.

The present invention provides a reciprocating external combustion engine wherein energy is supplied to a working end space of the engine by means of a heat transfer medium which comprises.

The external combustion engine of this invention includes a cylinder which may comprise a single doubleacting cylinder having a piston therein defining on one side of the piston (usually the rod-end side) a compressor end space and on the other side of the piston a working end space. However, this would not preclude the use of mechanical equivalents to this arrangement, for example the use of two cylinders coupled to a common shaft, one of the cylinders providing by its piston the compressor end space and the other cylinder providing with its separate piston the working end space.

The engine may also comprise a pair of opposed pistons reciprocatable within a common cylinder, such that the working end space is defined by the two piston crowns and the cylinder walls.

Various inlet and outlet valves of conventional construction are provided as necessary, and may be in the form of check valves or may be driven by means of a cam operated by the engine. However, this would not preclude the absence of valves, for example the piston may be arranged to open and close outlet ports as in a two-stroke engine.

An injector is also provided for injecting a preheated liquid heat-transfer medium into the working space. The purpose of the injected liquid medium is to enable heat transfer from a heat exchanger to the working end space, and so to increase the pressure of vapour in the working space.

During operation of the engine the working end space will contain a certain residual amount of heat-transfer medium vapor and usually some liquid medium. Heat-transfer medium will vaporize at least partially in the working space under the engine working conditions after injection.

To avoid confusion the following terms as used herein will be clarified. The heat-transfer medium may be present in its liquid, or vapor state. The term wet vapor is used to mean that the injected liquid is present in both its liquid state (e.g. as droplets) and in its vapor state simultaneously.

Preferably, the liquid medium is heated by means of a fuel-burner in a compact heat exchanger, for example a coil of narrow bore tubing, to a high pressure and high temperature (i.e. to a high internal energy). Since such narrow bore tubing can withstand great pressures, it is usually possible to heat the liquid up to its critical point.

The heat exchanger preferably comprises a burner for heating the liquid medium. Preferably, a compressor is provided for feeding combustion gas, usually air, to the burner. However a compressor is not essential.

The compressor may be provided by a compressor end space of the cylinder. However, a separate rotary or reciprocating compressor might be provided, such as a vane or turbine compressor. For special applications where the rate of heat transfer is to be high, it may be preferred to heat the medium to a temperature and pressure above its critical point. The hot pressurized liquid is then injected into the working space. Internal energy of the heat-transfer medium is rapidly transferred on injection from the hot liquid droplets to the working space as liquid vaporizes, thereby increasing the pressure. The vapor in the working end space of the cylinder expands (usually polytropically, i.e., non-adiabatically) to drive the piston and do work.

The heat-transfer medium is a vaporizable liquid, such as water, some of which flashes to vapor following injection into the working end space. Thus, heat transfer between the hot injected water vapor and the vapor in the working space is very rapid. Therefore, it may be seen that the injected liquid is merely acting as a heat transfer fluid which enables the vapor in the working space to convert internal energy to mechanical work. It is desirable that the heat-transfer medium has a high thermal conductivity in order to maximize heat transfer in the heat exchanger. The medium is preferably selected from water, oil or mixtures thereof. Mixing may occur internally or externally of the working space. It is possible that the working space may contain vaporizable heat-transfer medium, which may be caused to vaporize by injection of heated liquid medium (which itself need not be vaporizable). In order to assist lubrication of the engine, the water may be used as a mixture with an oil e.g. as an emulsion, dispersion or a solution of water and a water-soluble oil.

During operation a residual amount of vapor from vaporization of the heat-transfer medium and usually some liquid, will always be present in the working space. The retention of some residual liquid medium in the working end space after exhaust is desirable for reasons which will appear more clearly later, since it reduces the pressures achieved during the compression stroke. Thus, it may be desirable to construct the cylinder and/or piston such that some liquid medium is retained in the working space after exhaust. Generally this may be achieved by providing appropriate recesses in the piston or cylinder.

The pressure in the working space at bottom dead center (BDC) will generally be greater than atmospheric pressure (1 bar) and it will generally be preferred to depressurize the exhausted medium to substantially 1 bar pressure. The pressure at top dead center (TDC) is determined by the compression ratio. The compression ratio employed may vary widely depending on the particular application of the engine. Thus in some applications a compression ratio as low as 1.5:1 or perhaps lower may be employed. In other applications the compression ratio may be as high as 20:1. The engine preferably has a bore:stroke ratio from 0.5:1 to 1:3.

The present invention is to be distinguished from a steam engine in that the heat-transfer medium is maintained in its liquid form and not allowed to vaporize until it is introduced into the working space. This is in sharp contrast to a steam engine, wherein even if a flash boiler is used, the water is always introduced into the cylinder in the form of steam. In fact, since it is necessary to superheat the steam to remove water droplets in a conventional steam engine, it is not possible to directly flash liquid water into the cylinder of a steam engine since this would give rise to water droplets in the cylinder. However, in the engine according to the present invention, it is preferred that the majority of the water be present in the working space as liquid droplets, since this reduces the amount of recondensation to recover latent heat of vaporization which need occur.

Since the majority of the water is injected and exhausted in the liquid state, there is substantially no entropy increase due to vaporization. In the Rankine cycle this vaporization represents a theoretical limit on the efficiency of a steam engine since work must be performed to recondense the exhausted steam to liquid water. Such complete vaporization is unnecessary in the present invention so that almost all the internal energy lost by the injected liquid water may be converted into useful work. The majority of the heat-transfer medium does not usually change its state. Thus, the theoretical efficiency of the cycle of the present invention is greater than the efficiency of the Rankine steam cycle.

It is necessary that the heated heat-transfer medium be maintained in the liquid state prior to injection. Although this may be achieved by using appropriate sensors to ensure that the temperature at a given pressure never exceeds the liquid boiling point, it has been found that if an orifice of suitable size is connected to the heat exchanger in which the liquid medium is heated and a flow of liquid medium is maintained through the heat exchanger, then the application of heat to the liquid medium does not cause the liquid to boil. Thus, by correct choice of orifice size, complex temperature and pressure sensing devices may be avoided. So long as the orifice provides a pressure drop, the pressure in the heat exchanger will at all times be such that, as the temperature is increased, the pressure of the water in the heat exchanger will also increase and thereby be always below the boiling point. The orifice normally forms part of the injection means through which the liquid medium is injected.

The rate of working of the engine may be controlled by any of several means. It may be controlled by varying the amount of heat transfer medium injected into the cylinder, for example, by using a variable displacement pump. The rate of working of the engine may be controlled by controlling the amount of heat supplied by the burner, for example by controlling the fuel supply to the burner (for a constant liquid volume injection rate).

Usually, the heat-transfer medium is recovered after it has been exhausted from the working space. The exhausted medium will still be somewhat heated and may be recycled again to the heat exchanger so that its internal energy is not lost. In this way, the medium acts merely as a heat transfer fluid and is not substantially used up.

Water is a preferred heat transfer medium. Means may be provided for recovering water produced by combustion in the burner. Thus, it may be possible to avoid any need for make-up water since this will be provided by water from combustion in the burner.

The gas fed to the burner is capable of taking part in the combustion process which occurs in the burner. The gas may be a gas capable of supporting combustion, such as oxygen, air or other oxygen-containing gas, or nitrous oxide. Alternatively, the gas may itself be a combustible gas chosen from all known combustible gases, such as gaseous hydrocarbons, carbon monoxide, or hydrogen.

The fuel burnt in the burner itself may be chosen from known combustible fuels such as gasolines, fuel oils, liquefied or gaseous hydrocarbons, alcohols, wood, coal or coke.

It is in general preferred to use various heat recovery means. Thus, the whole engine may be enclosed in a heat insulating enclosure and be provided with heat exchangers to pick up stray heat and transfer it, for example, to preheat the fuel for the burner. It is also preferred to recover the heat remaining in the burner flue gases and this may be achieved by passing the flue gases through a spray chamber in which a stream of liquid (generally the same liquid medium as that injected into the engine) is sprayed through the flue gases. It is preferred that the liquid medium be sprayed through the flue gases to heat the liquid medium close to its boiling point prior to being passed to the heat exchanger. Moreover, when water is employed, the use of a water spray chamber or a condenser is advantageous in that water from the burner may be condensed out of the flue gases so that it is not necessary to provide make-up water to the engine. Usually exhausted heat-transfer medium includes a proportion of vapor. This vapor may be separated from liquid medium in a trap and fed with combustion gas to the burner, thereby preheating the combustion gas and condensing more of the vapor.

The construction of an engine according to the present invention is considerably simplified in certain respects in comparison with known engines, such as internal combustion engines. Thus, the temperatures encountered in the working space are generally reduced, so that the problems of sealing around the pistons are simplified. It will be appreciated that power may be provided in the engine of the present invention at lower temperatures than, for example, an internal combustion engine. Moreover, the internal combustion engine is less thermally efficient in that means must be provided to cool the cylinders and prevent seizing up.

Moreover, since the temperatures encountered in the engine are relatively low, for example up to 250° C., it is not usually necessary to construct the cylinder of metal. Plastics such as polytetrafluorethylene (PTFE), fiber-reinforced resins, and other plastics used in engineering, are particularly advantageous due to their cheapness and ease of use. Other heat insulating materials such as wood, concrete, glass or ceramics may also be used.

In a preferred embodiment, the hot liquid is injected into one end of the working end space and the outlet is at the other end of the piston stroke. The use of low heat conductivity materials allows the one end of the cylinder to be hot while the outlet region is relatively cool.

Power is usually taken from the engine by means of a piston rod attached to the reciprocating piston. The free end of the piston rod may be connected to an eccentric shaft on a rotary flywheel or by using a crankshaft so as to convert the reciprocating motion into a rotary motion.

Although the invention has been described in relation to an engine having a single cylinder, it will be appreciated that multicylinder engines of two or more cylinders will generally be preferred in practice. Each engine will usually only require a single heat exchanger and spray chamber.

The invention also relates to a method of operating a reciprocating external combustion engine, and to a kit of parts for converting an engine (e.g. an internal combustion engine such as a diesel engine) to an engine according to the present invention.

BRIEF DESCRIPTION OF THE DRAWINGS

Embodiments of the invention will now be described with reference to the accompanying drawings wherein.

DESCRIPTION OF THE PREFERRED EMBODIMENTS

Figure 1:
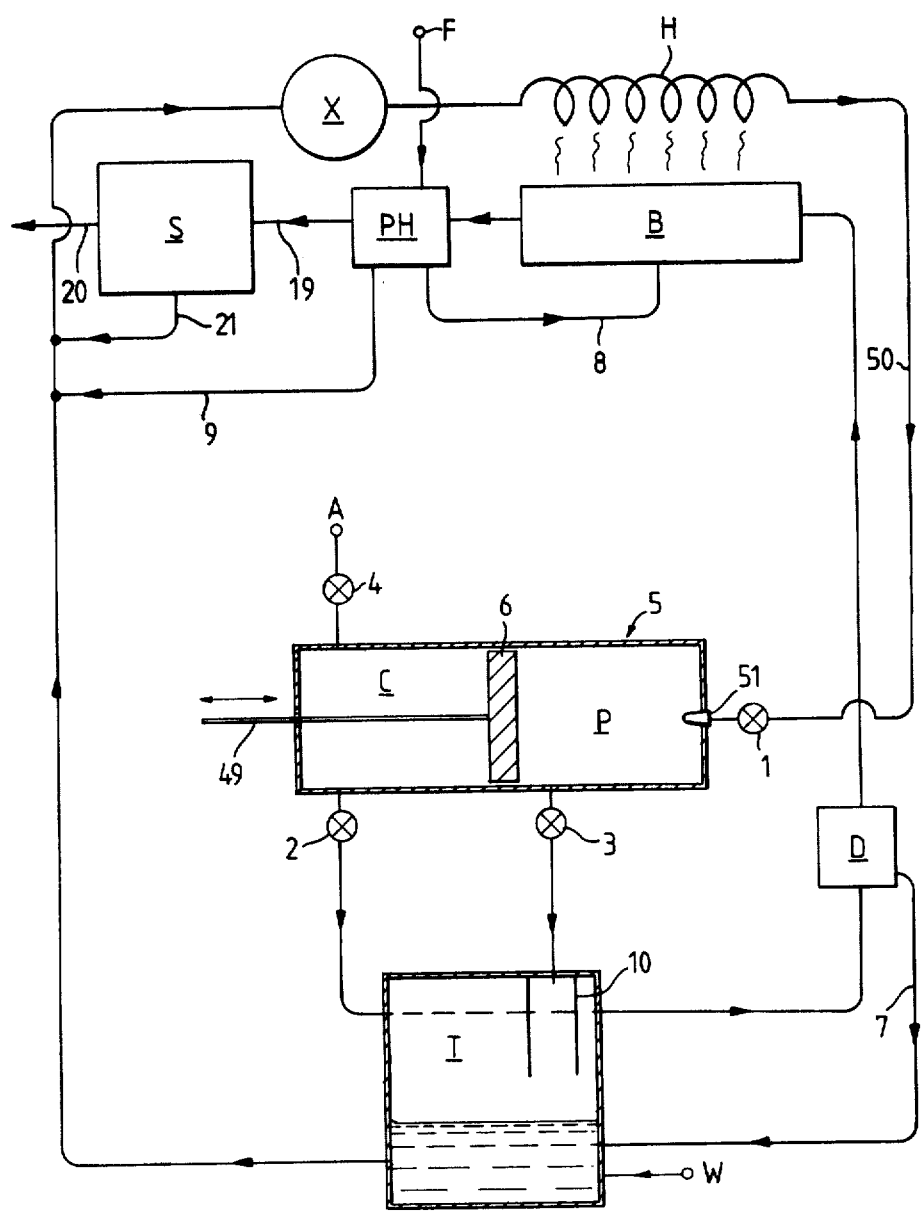
FIG. 1 is a schematic view of a first embodiment of external combustion engine according to the present invention.

In carrying out the invention in one form thereof, as shown in FIG. 1, the external combustion engine comprises a cylinder having piston 6 defining a compressor end space C and a working end space P, a heating coil H of a heat exchanger for heating liquid water under pressure by means of a burner B, an optional preheater PH for preheating fuel for the burner by means of burner flue heat, a spray device S for cooling and washing flue gas from the burner, pump X for feeding water under pressure to the heating coil, a trap T for recovering and separating vapor and liquid water from the exhaust from the working space, and a gas dryer D for recovering liquid water from the combustion gas supplied to the burner.

The external combustion engine works in the following manner. Air A at atmospheric temperature and pressure is inducted into compressor end space C of the cylinder 5 by moving piston 6 to the right (as viewed in FIG. 1) and thereby opening inlet check valve 4. The outlet from the compressor end space C is closed by means of check valve 2. When the piston 6 has reached the extreme right of its travel (top dead center—TDC), inlet valve 4 closes. Continued movement of the reciprocating piston back towards the left causes the air to become compressed.

Compression is continued to provide a sufficient pressure of air in space C for operating the burner B. As the piston approaches BDC, outlet valve 3 opens to exhaust wet vapor from working space P. Check valve 2 is also opened to admit compressed and slightly heated air to the trap T.

Shortly after BDC valves 2 and 3 are closed and as the piston moves toward TDC again, the residual saturated dry water vapor in the working space P is compressed.

Around top dead center, hot pressurized liquid water is injected through valve 1 and associated injector 51 causing a rapid increase in pressure within the cylinder (along line bc in FIG. 6) due to heating of water vapor already in the working space and due to vaporization of some of the injected water. The piston then moves back towards bottom dead center, the working space becoming depressurized and cooled in the process. The expansion of the vapor in the cylinder is represented by the line cd in FIG. 6. Around bottom dead center wet vapor is expelled from the cylinder and passes via valve 3 and cylindrical baffle 10 to the trap T. In the trap T, the liquid water at substantially atmospheric pressure is recovered and recycled to the heating coil H wherein it is pressurized and heated. Make-up water W may be fed to trap T as required.

The dry saturated vapor in trap T is mixed with compressed air from compressor space C, thereby preheating the combustion air which is then passed to the burner B.

An optional dryer D is interposed between the trap T and the burner and liquid condensate is returned along line 7 to the trap.

The preheater PH preheats fuel F which then passes to the burner along line 8. Any water thereby condensed from the flue gases is recycled via line 9 to the pump.

Depending on the compression ratio and the rate of working at the time, the temperature of the injected water may be above or equal to the temperature of the working space just prior to injection.

Figure 2:
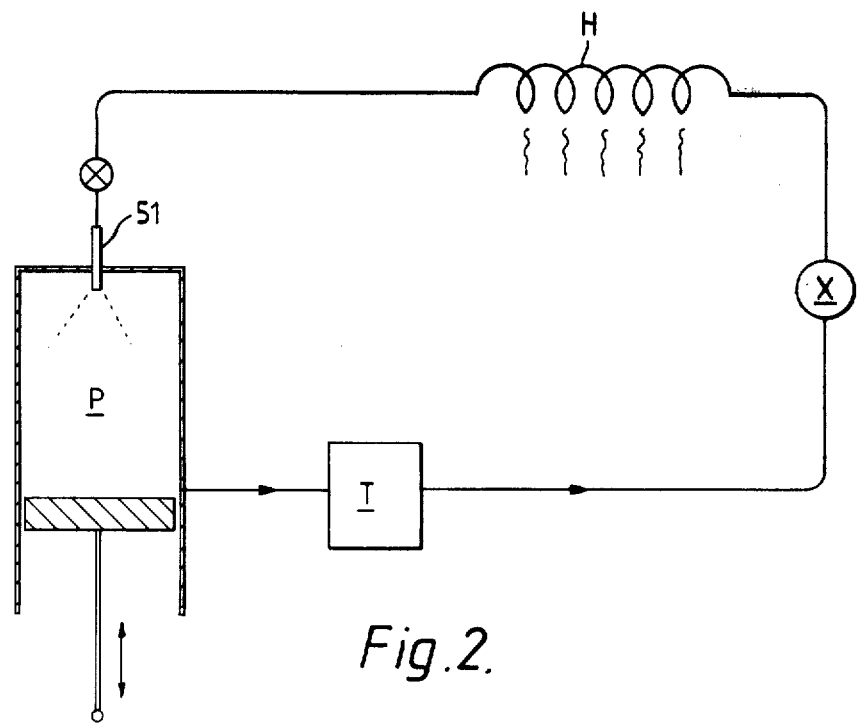
FIG. 2 is a simplified view of the first embodiment illustrating its principle of operation.

FIG. 2 emphasizes the fact that the water itself acts principally as a heat transfer fluid which is recycled after use. The only water lost from the system is that carried out in the cooled flue gases from the spray chamber S.

The cycle will now be described in more detail.

Heated water at atmospheric pressure and a temperature of below 100° C. is fed from trap T (and possibly from the spray chamber S and preheater PH) to the pressure pump X whence it is delivered at a high pressure to the heating coil H. The water in the heating coil H is heated to a temperature of around 300° C. and a pressure of around 86 bar. In principle, the water may be heated to any temperature above or below its critical temperature and pressure (220.9 bar and 374° C.), however, the pressure will always be such that at any temperature it will maintain the water in its liquid state.

The working space P contains residual water from the previous stroke, as liquid and vapor. As the piston moves towards TDC, the dry saturated vapor is compressed to around 22 bar and (for a 16:1 compression ratio) to a temperature of around 217° C. at top dead center. Some vaporization of the residual water may occur during compression depending on the piston velocity. This minimizes superheating of the compressed vapor, thereby maintaining the vapor in the dry saturated state.

At TDC, hot pressurized water at around 86 bar and 300° C. is injected into the working end space P via injector 51 and some liquid water immediately flashes to become vapor, thereby atomizing the remaining injected liquid water and rapidly increasing the pressure in the space P. Water injection is continued for around 5 to 25% of the whole stroke. The pressure reached depends on the amount and temperature of the liquid water injected and on how much of that vaporizes.

The rapid rise in pressure causes the piston 6 to move towards BDC again. Around 35° before BDC the exhaust valve 3 opens to exhaust water liquid and water vapor from the space P. The exhaust is passed to the trap T where the liquid water is recovered and then returned to the heating coil H.

While the present invention has been described using a piston compressor in either the same or a different cylinder from the working end space, it will be appreciated that if required any other type of compressor may be used, for example a rotary compressor or fan.

Figure 3:
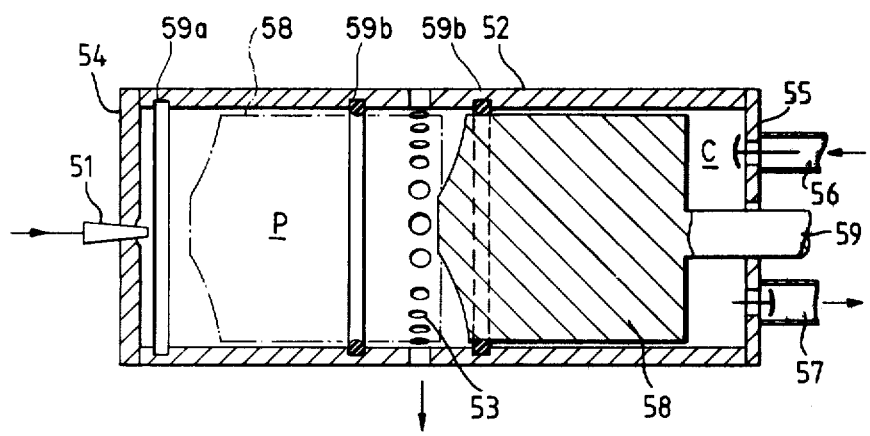
FIG. 3 is a schematic cross-sectional view of a cylinder of the engine.

This embodiment allows a particularly simple cylinder construction, such as the one shown in FIG. 3. The relatively low temperatures encountered allow the use of engineering plastics materials in the construction of the cylinder, and indeed such materials have important low heat conductivity advantages.

The cylinder shown in FIG. 3 comprises a uniflow cylinder body 52 having a row of circumferentially arranged ports 53 which constitute the outlet from the working end space P of the cylinder. A cylinder head 54 having the water injector 51 mounted therein is attached to one end of the body 52 and an end plate 55 having therein an inlet 56 and outlet 57 (and respective check valves) is provided for the compressor end space at the other end of the cylinder. A piston 58 and piston rod 59 is provided within the cylinder. The ports 53 are arranged to be uncovered by the piston 58 as the piston approaches the end of its expansion stroke.

It will be appreciated that the end of the cylinder adjacent the injector 51 is at a relatively high temperature, whereas the end of the cylinder adjacent the outlet ports 53 is at a relatively low temperature. The use of plastics materials having a low thermal conductivity allows this advantageous temperature differential to be maintained. Thus, were heat to be allowed to be conducted towards the outlet ports 53, the temperature of the exhaust would be raised, thereby resulting in loss of thermal efficiency.

The cylinder schematically represented in FIG. 3 includes a circumferential recess 59a in the cylinder wall for retaining liquid medium in the working space after exhaust.

In addition, as shown in FIG. 3, at least two seals 59b are mounted in circumferential recesses in the cylinder wall. The piston of this invention need not fit closely against the cylinder wall, since communication between the working end space and the compressor end space can be blocked by the seals 59b, as illustrated by the dotted line view of piston 58 in FIG. 3 which shows the piston at the end of its compression stroke. Having the piston slightly spaced from the cylinder wall provides an advantage in that any scale deposited on the cylinder wall from the water will not interfere with the operation of the engine until a substantial amount has accumulated, and maintenance is thereby reduced.

When a multicylinder engine is used, individual cam-operated injector valves may be provided on each cylinder. Alternatively, a distributor may be provided to periodically distribute hot pressurized water to the appropriate cylinder. The injectors may deliver a constant volume of water at a variable temperature. However, injectors delivering a variable volume of water at constant temperature might also be used—particularly when a more rapid change in working rate is required.

Figure 4:
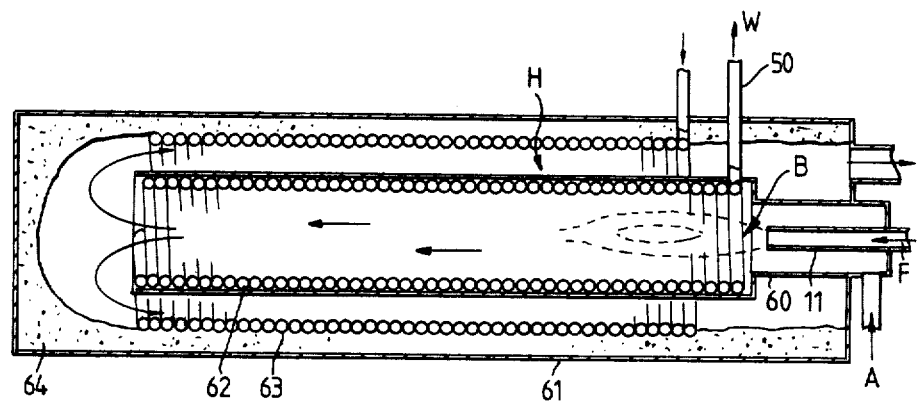
FIG. 4 is a schematic cross-sectional view of a heat exchanger of the engine.

FIG. 4 shows the construction of the heat exchanger, which combines the heating coil H and the burner B. The heat exchanger comprises inner and outer coaxial sleeves 60 and 61, respectively, defining a double path for flue gas from the burner. Insulation 64 is provided around the outside of the heat exchanger. A fuel inlet jet is provided for burning fuel F in air A admitted via an air inlet. Water W passes through a heating coil H which comprises an inner coil 62 and outer coil 63 in the direction indicated by the arrows such that water exits from inner coil 62 at a position close to the highest temperature of the burner. The hot pressurized water is then fed along pipe 50 prior to injection into the working space P.

Figure 5:
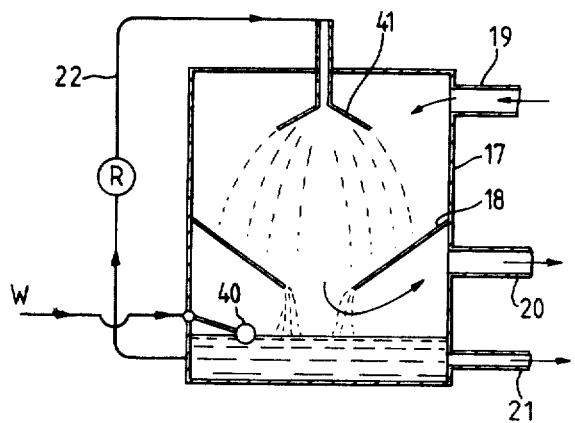
FIG. 5 is a schematic cross-sectional view of a spray device for cooling flue gas from the burner.

FIG. 5 shows a spray device for cooling and washing the flue gases from the burner B and thus recovering some of the heat and some water produced by the combustion. It comprises a spray chamber 17 having therein a funnel 18 onto which water is sprayed by spray 41 through the stream of hot flue gases. The flue gases are inducted via inlet 19 and arranged to flow tangentially around the chamber before exiting through the exit 20 as cooled flue gas. The flue gases thus pass through the spray and then through a curtain of water falling from the inside aperture of the funnel 18. Preferably the flue gases are cooled to below 100° C. so as to recover the latent heat of vaporization of water from the burner. Water at substantially 100° exits through the outlet 21 before being fed by pump X into the heat exchanger. Cold feed water W is introduced into the chamber via a ballcock 40 for maintaining a constant level of water in the bottom of the spray chamber. A recycle pump R and associated ducting 22 is provided for recycling the water through the spray to bring it up to its boiling point. However, in practice, if it is desired to cool the flue gases below 100° C., it may be necessary to withdraw water through the outlet 21 at a substantially lower temperature, e.g. 50° C.

Figure 6:
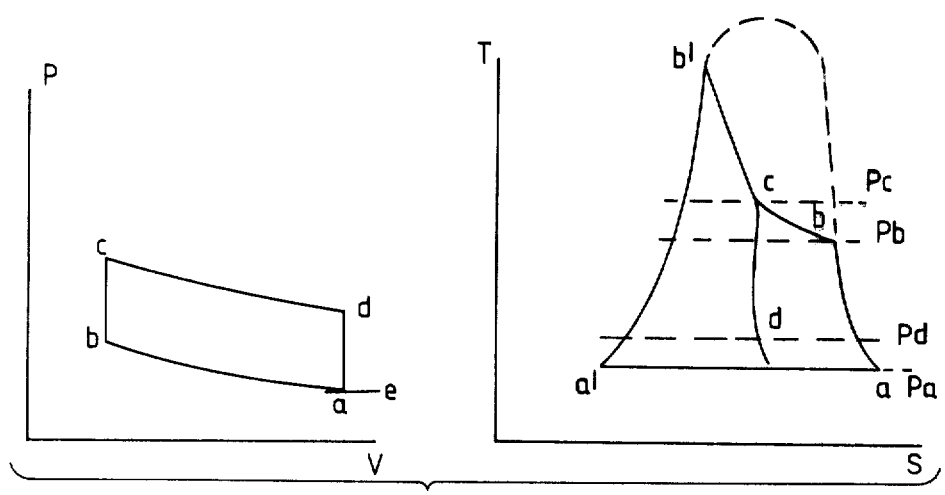
FIG. 6 shows pressure (P) versus volume (V), and temperature (T) versus entropy (S) diagrams for the first embodiment.
Figure 7:
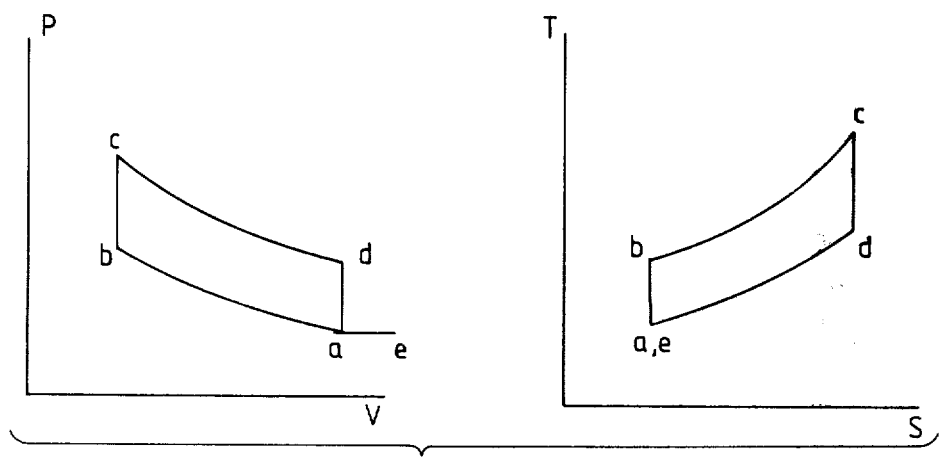
FIG. 7 shows for comparison the PV and TS diagrams for the known two-stroke internal combustion engine.

FIG. 6 shows the idealized thermodynamic operation of the engine of FIG. 1. FIG. 7 shows for comparison the operation of a conventional two-stroke internal combustion engine.

Without wishing to be in any way limited to any specific theory, it is believed that the operation of the engine may be represented as follows.

FIG. 6 shows PV and TS diagrams. The majority of the injected water remains in the liquid phase as droplets.

At all times there is a residual volume of dry saturated vapor in the working space. To a first approximation, the residual vapor may be regarded as a gaseous working fluid which takes up and gives out heat during each operating cycle, thereby doing work. The working space will also contain residual liquid water.

Water vapor in the working space P is compressed during the compression stroke along line ab. The compression is not isoentropic due to vaporization of residual water in the cylinder.

The vaporization of residual liquid water in the working space during compression results in a reduction of entropy of the vapor. If there were no residual liquid water in the working space, adiabatic compression of the water vapor would cause the line ab in the TS diagram to be vertical, i.e., the water vapor would be superheated. However, in the presence of liquid water any tendency for the water vapor to become superheated is counteracted by vaporization of some of the liquid. Thus, the line ab follows the dry saturated vapor line on the entropy dome (shown in dotted lines) for water.

At constant volume hot pressurized liquid water is injected at point b at a higher temperature than the compressed dry saturated vapor in the working space, and a portion of the water vaporizes so that the pressure increases along bc from $P_b$ to $P_c$. The temperature T of the dry saturated vapor also increases, while the entropy of the vapor decreases to c.

As the piston descends the wet water vapor expands along cd—however, due to the presence of hot liquid water droplets, the expansion is not adiabatic but polytropic due to heat transfer from the liquid water so that the curve cd on the PV diagram is flattened. The expansion also produces a fall in T and a small increase in entropy S.

On exhaust from the working space the pressure and temperature in the working space falls along da.

The figure a', b', c, d in the TS diagram represents the cycle undergone by the liquid water. Thus, the liquid water is heated in the heating coil along a'b' and injected into the working space at b'. The temperature of the liquid water then falls along b'c after injection and thereafter the liquid and vapor are in equilibrium.

Typical operating conditions are as follows. The pressure $P_a$ at a is 1.2 bar and the temperature $T_a$ is 378K (105° C.). At a compression ratio of 16:1 the pressure $P_b$ and temperature $T_b$ at b rise to around 22 bar and 290K (217° C.). Liquid water at 573K (300° C.) and 86 bar is then injected into the working space at b and a portion becomes vapor, the rest remaining as liquid. This causes an increase in pressure along bc (typically $P_c$=30 bar) and an increase in temperature due to injection of the warmer water ($T_c$=507K (234° C.)). The reduction in entropy along bc of the water vapor originally in the cylinder arises from injection of water in the liquid state. As the piston moves back towards BDC, the water vapor expands along cd to a pressure $P_c$ of about 2 bar and a theoretical temperature $T_d$ of about 393K (120° C.). The water vapor and liquid water are then exhausted from the working space along da causing a decrease in temperature and pressure, and an increase in the entropy of vapor in the working space.

FIG. 7 shows PV and TS diagrams for the known two-stroke cycle internal combustion engine for comparison. Air is inducted at a and compressed adiabatically and isoentropically along ab. The temperature at b is greater and the slope of ab steeper than for the cycle of the present invention. The presence of liquid water in the working space in the cycle of the present invention flattens ab since energy is needed to vaporize liquid water during compression.

In the two-stroke cycle internal combustion engine fuel is then burned in the cylinder, increasing the pressure, temperature and entropy along bc. In the cycle of the present invention the pressure increases slightly due to some liquid water flashing to vapor, and the temperature of water vapor in the working space increases. However, whereas in the two-stroke cycle there is an increase in entropy along bc, in the cycle of the present invention there is a decrease in entropy of the water vapor in the working space due to the addition of liquid water on injection.

Thereafter adiabatic isoentropic expansion occurs along cd, heated liquid water in the working space in the cycle of the present invention giving up heat and thereby causing a flattening of the PV curve in comparison to the curve for the two-stroke cycle.

The high thermal efficiency of the cycle of the present invention resides in the fact that, whereas in the two-stroke cycle internal combustion engine the gas exhausted from the cylinder is at a high temperature and pressure, in the present invention only liquid water and a small amount of vapor is exhausted. Thus, liquid water is injected into and exhausted from the working space.

Most of the injected water after injection remains in the liquid state (ignoring the small amount of water which flashes to vapor) and so there is no significant entropy increase due to vaporization, and the internal energy lost by the injected water is converted almost completely into useful work. Moreover there is no need to scavenge the cylinder at the end of the cycle, in the present invention so that heat of the vapor is not lost. The presence of the residual liquid water droplets on the walls of the working space ensures that it contains the required residual water vapor ready for recommencement of the cycle. The line ae represents the opening of the exhaust valve before the end of the stroke.

Figure 8:
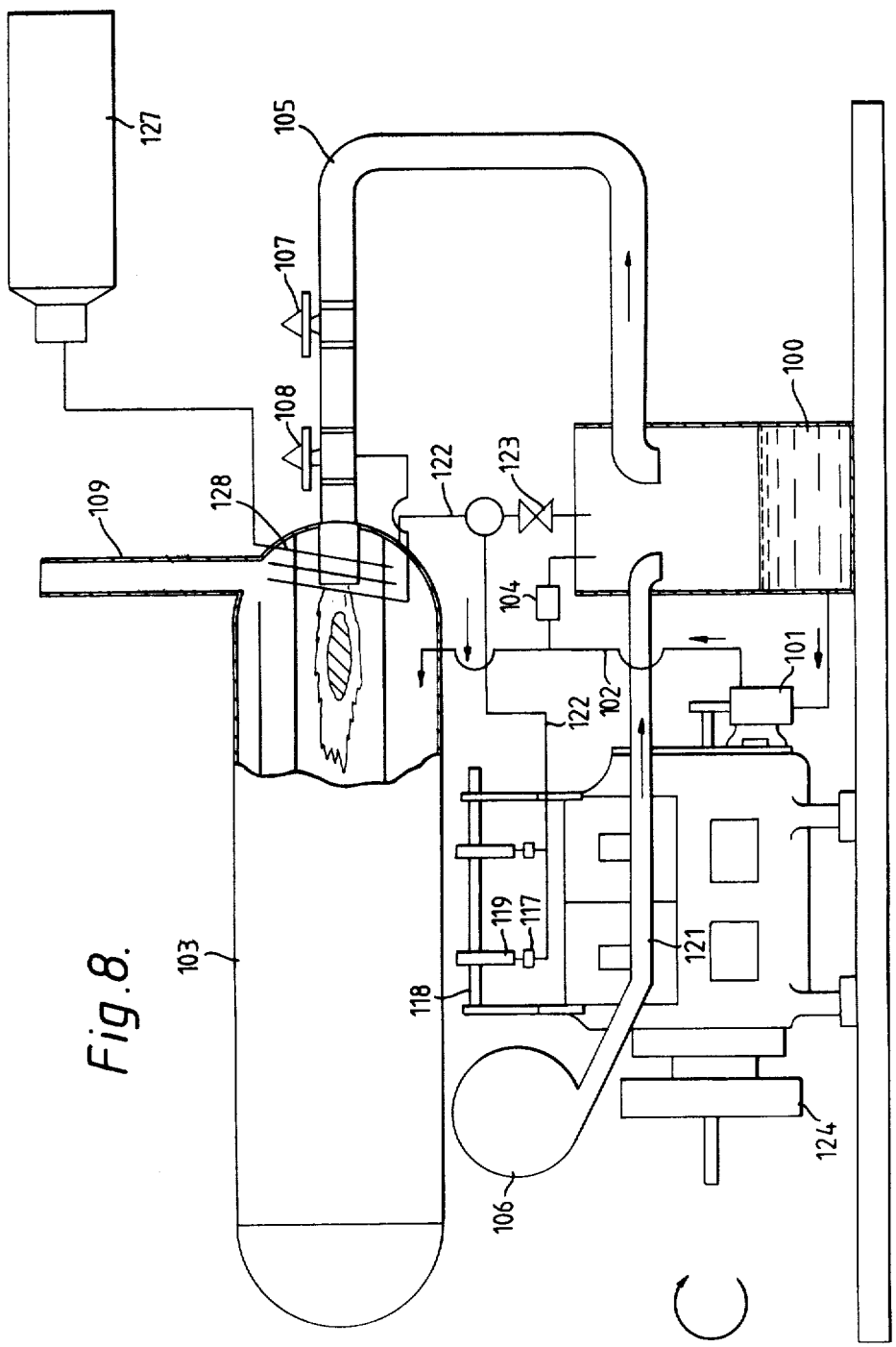
FIG. 8 is a schematic elevation of a second embodiment of the invention.
Figure 9:
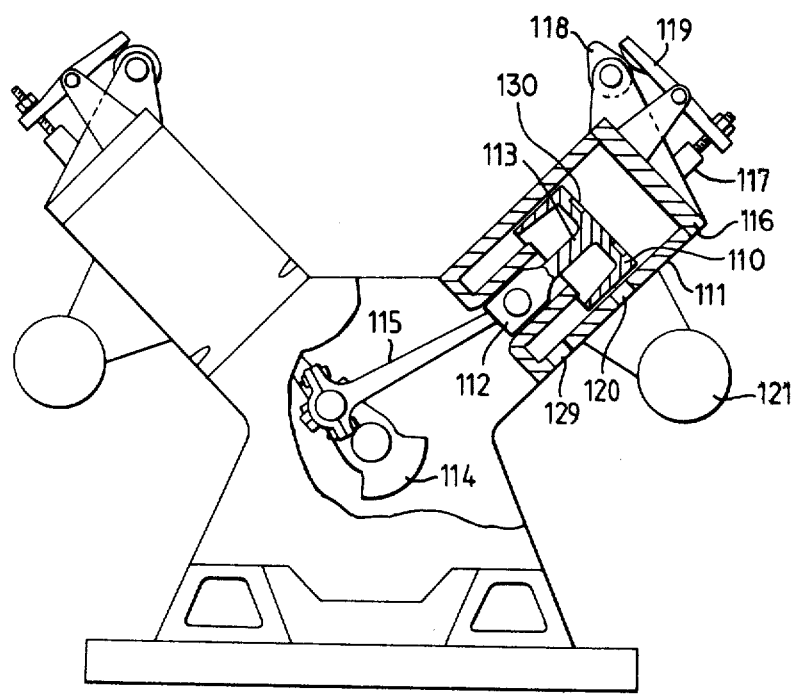
FIG. 9 is an end view in partial cross-section of FIG. 8.
Figure 10:
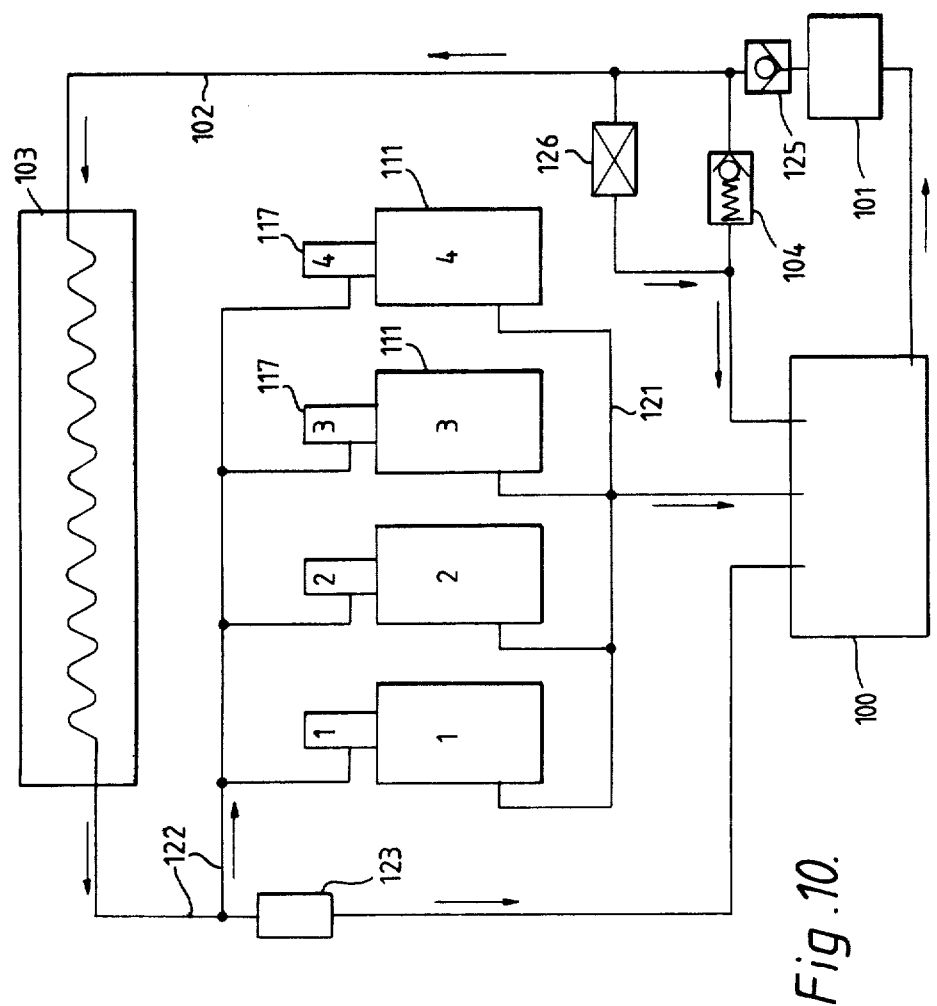
FIG. 10 is a flow diagram showing the recycled water circuit.

FIGS. 8, 9 and 10 illustrate a practical form of the invention, which is similar in principle to the embodiment shown schematically in FIG. 1 except that no spray chamber is used and a rotary air blower feeds a mixture of air and dry saturated vapor to the burner.

The engine comprises four cylinders arranged in a 90° V-configuration. Water is pumped from a closed storage trap 100 (corresponding to trap T in FIG. 1) by a high pressure pump 101 along a pipe 102 to a two-stage counter flow heat exchanger 103 of a construction as shown in FIG. 4. A pressure relief valve 104 is provided between pipe 103 and trap 100. Air and hot exhaust water vapor from trap 100 are directed to the heat exchanger 103 along duct 105 by a rotary air blower 106. The air flow is controlled by valve 107. Fuel (e.g. propane gas) is introduced from tank 127 through preheater 128 into the air flow through fuel valve 108. Flue gases leave the heat exchanger via flue 109.

Each piston 110 runs in a respective cylinder 111 and is connected to a crosshead 112 by a piston rod 113. The cross head is connected to a crankshaft 114 by a further rod 115. Each cylinder has a cylinder head 116 provided with an injector 117 which includes a poppet valve operated by a cam on a camshaft 118 by means of a rocker arm 119. Each cylinder also has an exhaust port 120 onto common exhaust manifold 121 which returns wet exhaust vapor to the trap 100. A flywheel 124 is mounted on the crankshaft. A breather port 129 is provided.

It has previously been pointed out that recesses may be provided in the cylinder or piston to retain liquid medium in the working space after exhaust. In FIG. 3 there has been shown a recess 59a in the cylinder for this purpose. The engine shown in FIG. 11 has recesses 130 provided in the piston head for this purpose.

An engine having a 16:1 compression ratio, a 4" diameter piston and a 4" stroke and each cylinder delivers around 15 horsepower at a water injection temperature of around 300° C. and a pressure of 86 bar. The inclination of the cylinders assists exhaust of liquid water by gravity. At 300° C. typically about 5 grams of water would be injected per injection. The entire engine is contained with a heat-insulated enclosure.

Hot liquid water leaves the heat exchanger along pipe 122 and is fed to the injector 117. A pressure control valve 123 is provided between pipe 122 and the tank.

FIG. 10 shows the water circulation circuit in more detail. A check valve 125 is provided downstream of the pump 101 to prevent flash-back of water vapor into the pump. A pressure control valve 126 is provided in parallel with the pressure relief valve 104 and may be used to control the rate of working of the engine.

The external combustion engine shown is capable of very high thermal efficiency. Theoretically, cold fuel F, cold air A, and cold water W (if any) are inducted into the engine, and cold flue gas is vented. Therefore, almost all the heat given out by the burner may become converted into work. In practice, thermal efficiencies of the order of 50 to 80% appear to be attainable.

While it is contemplated that this invention will be carried out by manufacturing new engines incorporating the features disclosed in this invention, it may also be carried out by converting some existing internal combustion engines to operate in accordance with the principles of this invention. For this purpose a kit may be supplied incorporating the necessary components for making such a conversion. Such a kit would include a heat exchanger, including a fuel-air burner, for heating water to the necessary temperature and pressure; an insulated cylinder and piston, the cylinder having an inlet for liquid water and an outlet for wet exhaust vapor; a compressor for supplying gas into a separating chamber and to the burner; a pump for transmitting liquid water from the cylinder to the heat exchanger, an injector for injecting liquid water under pressure from the heat exchanger into the cylinder, a metering device for controlling the amount of water injected into the cylinder, and a separating chamber for separating liquid water from dry saturated vapor.

It is claimed:

1. A method of operating a reciprocating external combustion engine having a cylinder and a piston therein defining a working end space, wherein energy is supplied to the working end space by means of a vaporizable heat-transfer medium, which comprises
   (1) in a compression stroke of the piston, compressing vapor heat-transfer medium present in the end space;
   (2) generating externally of the cylinder heated heat-transfer medium under a pressure such as to maintain the medium in the liquid state;
   (3) injecting into the compressed vapor heat-transfer medium in the working space said pressurized heated liquid medium, whereby part of the liquid medium spontaneously vaporizes, the remainder remaining as liquid, and raises the internal energy of the working space;
   (4) in an expansion stroke of the piston, allowing the volume of the end space to expand thereby driving the piston, and allowing some recondensation of vaporized medium to occur;
   (5) exhausting a mixture of liquid and gaseous heat-transfer medium from the end space and leaving in the end space residual gaseous heat-transfer medium;
   (6) receiving said exhausted mixture of liquid and gaseous heat-transfer medium in a trap; and
   (7) recycling heat-transfer medium in the liquid state from the trap to step (2) for the generation of further pressurized heated liquid heat-transfer medium.

2. A method according to claim 1 wherein the heat-transfer medium is selected from the group consisting of water, oil and mixtures thereof.

3. A method according to claim 1, or 2 wherein during the compression stroke the working end space contains heat-transfer medium in both the liquid and gaseous states.

4. A method according to claim 1, wherein the heated liquid heat-transfer medium has a temperature and pressure below its critical point but greater than its boiling point at atmospheric pressure.

5. A method according to claim 1, wherein the exhausted medium after exhaustion is at a pressure of substantially 1 atmosphere.

6. A method according to claim 1, wherein the majority of the injected liquid medium remains in the liquid state after injection into the end space.

7. A method according to claim 1, wherein the heat-transfer medium is water and the exhaust water is recycled to the engine, heat being supplied to the medium by means of a fuel-air burner, any losses in the recycled water being made up by condensing water from flue gases from the burner.

8. A method according to claim 1 wherein heat energy is converted into useful work with an efficiency greater than the theoretical efficiency of the Rankine cycle working between the same upper and lower temperatures.

9. A method according to claim 1 wherein the temperature of the injected liquid medium is greater than the temperature of the end space at the time of injection.

10. A reciprocating external combustion engine wherein energy is supplied to a working end space of the engine by means of a vaporizable heat-transfer medium, which comprises a cylinder, a piston within the cylinder, a working end space being defined by the piston and the cylinder, the piston being reciprocable in the cylinder so as to perform a compression stroke and an expansion stroke;
   a heat exchanger for heating externally of the cylinder the heat-transfer medium under a pressure such as to maintain the medium in the liquid state, the heat exchanger having an inlet for receiving heat-transfer medium and an outlet for delivering heated pressurized liquid heat-transfer medium;
   a high pressure pump connected to said heat exchanger inlet for feeding liquid heat-transfer medium to the heat exchanger;
   an injector connected to the outlet of the heat exchanger, control means for controlling the injector to inject the heated pressurized liquid medium into the working space near the end of the compression stroke of the piston, whereby part of the liquid medium spontaneously vaporizes in the working space, the remainder remaining as liquid;
   an outlet from the cylinder for exhausting heat transfer medium from the working end space near the end of the expansion stroke of the piston;

a trap connected to the outlet from the cylinder for receiving a mixture of liquid and gaseous heat-transfer medium exhausted from the cylinder; and recycle means connected to the trap for recycling therefrom heat-transfer medium in the liquid state to the high pressure pump.

11. An engine according to claim 10, wherein the heat exchanger comprises at least one tube for containing the heat-transfer medium and a fuel-burner for heating the medium in said at least one tube.

12. An engine according to claim 11 wherein the heat exchanger comprises a tube constructed in the form of an inner coil and an outer coil coaxial therewith, the burner being located within the inner coil, such that hot flue gas from the burner passes within the inner coil and then between the inner and the outer coils.

13. An engine according to claim 11, wherein air for combustion is fed to the burner by means of a rotary blower or compressor.

14. A engine according to claim 11 wherein the cylinder is a double-acting cylinder defining on one side of the piston said working end space and defining a compressor end space on the other side of the piston, the compressor end space being provided with an air inlet and an air outlet connected to the burner for feeding compressed air thereto.

15. An engine according to claim 10 wherein the piston and the cylinder are formed at least in part from a heat insulating material selected from the group consisting of plastics, fiber-reinforced resins, wood, concrete, glass and ceramics.

16. An engine according to claim 10 wherein said outlet from the cylinder comprises a port in the cylinder wall, said port being uncovered by the piston as the piston approaches the end of the expansion stroke.

17. An engine according to claim 10 having a compression ratio between approximately 1.5:1 and 20:1.

18. An engine according to claim 10 wherein the recycle means is a closed circuit operable at substantially atmospheric pressure.

19. An engine according to claim 10 or 18 wherein said trap includes an inlet for air, an outlet for feeding air to a burner of the heat exchanger, and an outlet for liquid medium connected to the heat exchanger.

20. An engine according to claim 10 wherein the injector is a poppet-valve operated by means of a cam.

21. An engine according to claim 10 wherein the cylinder and the piston are so constructed that some liquid medium is retained in the working end space after the exhaust of heat transfer medium.

22. An engine according to claim 21 wherein the cylinder is provided with a recess for retaining said liquid medium.

23. An engine according to claim 21 wherein the piston is provided with a recess for retaining said liquid medium.

24. An engine according to claim 10 wherein the bore:stroke ratio is from 0.5:1 to 1:3.

25. A reciprocating external combustion engine wherein heat energy is supplied to a working end space of the engine by means of heated pressurized liquid water at a temperature greater than the boiling point a cylinder, a piston within the cylinder, a working end space defined by said piston and said cylinder, the piston being reciprocatable in the cylinder so as to perform a compression stroke and an expansion stroke;

a heat exchanger for heating the liquid water externally of the working space to a temperature above the boiling point of water at atmospheric pressure, the heat exchanger having
  (1) an inlet for receiving liquid water and an outlet for delivering heated water,
  (2) at least one tube for containing said liquid water, and
  (3) a fuel-burner disposed for heating the liquid water in said at least one tube;

pressurizing means connected to said at least one tube of the heat exchanger for maintaining said heated water in the liquid state;

an injector mounted on said cylinder and connected to the outlet of the heat exchanger for receiving heated pressurized liquid water;

control means for controlling the injector to inject heated pressurized liquid water into the working end space near the end of the compression stroke of the piston, part of said water spontaneously vaporizing, the remainder remaining as liquid; and an outlet from the cylinder for exhausting cooled water from the working end space near the end of the expansion stroke of the piston, the majority of said cooled water being exhausted in the liquid state.

* * * * *